Patented Apr. 15, 1947

2,418,959

UNITED STATES PATENT OFFICE 2,418,959

ESTERS OF ω-CYANOGUANYLIMINODITHIO-CARBONIC ACID

Jack T. Thurston and Donald W. Kaiser, Riverside, Conn., assignors to American Cyanamid Company, New York, N. Y., a corporation of Maine No Drawing. Application December 20, 1943, Serial No. 514,986

12 Claims. (Cl. 260—551)

This invention relates to new organic compounds and to their preparation.

The new compounds of the present invention, whose preparation will be described hereinafter, may be represented by the following general formula

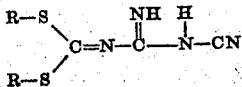

in which R is an alkyl or aralkyl radical. These compounds may be called alkyl and aralkyl esters of ω-cyanoguanyliminodithiocarbonic acid. They are useful as insecticides, vulcanization accelerators, textile assistants, and intermediates in the production of resins and other useful organic compounds.

Compounds having the structure just described may be prepared by treating an alkali metal or alkaline earth metal salt of ω-cyanoguanylimino-dithiocarbonate with an alkylating or aralkylating agent at temperatures not in excess of about 75° C. In doing so, we may use a wide variety of different types and kinds of known alkylating and aralkylating agents such as, for example, the alkyl halides, aralkyl halides, alkyl sulfates, aryl sulfonic alkyl esters, and the like. Representative examples of these alkylating agents include dimethyl sulfate, methyl iodide, methyl bromide, methyl p-toluene sulfonate, ethyl p-toluene sulfonate, propyl p-toluene sulfonate, butyl p-toluene sulfonate, lauryl p-brombenzene sulfonate, and other well-known alkylating agents which may be found upon reference to standard works on alkylation procedure. Further, as noted ante, we may also employ different types and kinds of aralkylating agents such as, for example, benzyl chloride, benzyl iodide, benzyl bromide, p-chlorobenzyl chloride and alpha-naphthyl methyl chloride, and other well known aralkylating agents in the practice of this invention. As a class, such aralkylating agents result in the substitution of an aralkyl group into the molecule of the compound being treated therewith in accordance with this invention. Thus, in the broad practice of this invention, we may employ either an alkylating or aralkylating agent in preparing the new esters having the generic structural formula given ante. In general, the said agents react with the alkali metal or alkaline earth metal salts of ω-cyanoguanyl-iminodithiocarbonate.

The alkali metal ω-cyanoguanyliminodithio-carbonates which we employ have the general formula

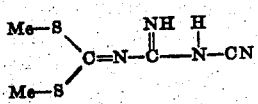

in which Me is an alkali metal such as sodium, potassium, or lithium; or an alkaline earth metal such as barium or calcium. A very good method of preparing these compounds is described in our copending application, Serial No. 489,988, filed June 7, 1943, now Patent No. 2,368,903, issued February 6, 1945. The method consists essentially in the steps of suspending an alkali metal or alkaline earth metal salt of dicyandiamide in a water-miscible, non-hydroxylated solvent such as acetone, followed by the addition of carbon disulfide in amounts sufficient to complete the reaction. This reaction is carried out at temperatures not in excess of about 65° C.

In alkylating ω-cyanoguanyliminodithiocar-bonates to produce the new compounds of the present invention, we ordinarily prepare a solution of the ω-cyanoguanyliminodithiocarbonate in water, or some other organic solvent such as alcohol or mixtures thereof, and add the alkylating agent thereto, with stirring, while keeping the temperature below about 75° C. The reaction proceeds faster at elevated temperatures, and the reaction mixture is usually heated. Inasmuch as the reaction is generally exothermic, however, it is not always necessary to heat the reaction mixture during the entire course of the reaction. In fact, cooling is often found necessary, after the reaction has once started, to prevent the temperature from rising too high. If the temperature is allowed to exceed about 75° C. for a substantial length of time, the salts of ω-cyano-guanyliminodithiocarbonic acid tend to cyclize, and different reaction products are formed. Accordingly, therefore, we carry out our alkylation at temperatures of from about 10° C. to about 75° C., and preferably, from about 50° C. to about 65° C.

Because the ω-cyanoguanyliminodithiocarbonates are difficult to store for long periods of time without some decomposition, we prefer to start with the compound, 2-thio-4,6-diamino-1,3,5-thiadiazine. This compound has the formula

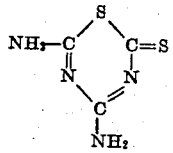

and may be prepared and stored for indefinite periods without decomposition. It may be prepared by simply treating an alkali metal or alkaline earth metal ω-cyanoguanyliminodithiocarbonate with an acid at temperatures up to 40° C. When starting with 2-thio-4,6-diamino-1,3,5-thiadiazine, this compound is first reconverted to an alkali metal or alkaline earth metal ω-cyanoguanyliminodithiocarbonate by treatment with an aqueous solution of an appropriate hydroxide. This procedure is illustrated in several of the specific examples which follow.

Our invention will now be described in greater particularity by means of the following examples, in which alkali metal or alkaline earth metal ω-cyanoguanyliminodithiocarbonates are reacted with a variety of different types or kinds of reagents, including alkylating and aralkylating agents, under various conditions to produce our new esters. It will be understood, of course, that these examples are given for the purpose of clearly illustrating the procedures which may be employed and are not intended to limit, and are not to be construed as limiting, our invention to the particular reactants and reacting conditions given. All parts are by weight unless otherwise indicated.

EXAMPLE 1

*Dimethallyl ω-cyanoguanyliminodithiocarbonate*

$$\begin{array}{c} CH_3 \\ | \\ H_2C=C-CH_2-S \\ \phantom{H_2C=C-CH_2-S}\diagdown \\ \phantom{H_2C=C-CH_2-S\diagdown}C=N-\overset{NH}{\overset{\|}{C}}-\overset{H}{\overset{|}{N}}-CN \\ \phantom{H_2C=C-CH_2-S}\diagup \\ H_2C=C-CH_2-S \\ | \\ CH_3 \end{array}$$

A solution containing 128 g. (0.542 mol) of dipotassium ω-cyanoguanyliminodithiocarbonate in 250 cc. of water was prepared and 100 g. (1.11 mols) of methallyl chloride added. The mixture was stirred and heated. Soon an exothermic reaction, which required intermittent cooling, occurred. The odor of methallyl mercaptan became noticeable and a tan oil formed. After heat was no longer evolved, the mixture was refluxed 15 minutes longer and then concentrated under reduced pressure. Some oil which contained mercaptan was steam distilled. After removal of the mercaptan, the hot mixture of oil and water was poured into dilute, ice-cold sodium hydroxide solution to dissolve any remaining mercaptan. A pasty mass formed. The water was decanted, fresh ice water added, and on stirring, the material solidified. After being ground with a pestle, the tan solid was filtered, washed well with water, and dried in a vacuum desiccator. The yield of crude product was 127 g. or 88% of theoretical. The material melted at from 60–70° C. Crystallization from carbon tetrachloride gave almost colorless plates melting at 73–75° C. Additional crystallization for analysis raised the melting point to 79–80° C. The material, dimethallyl ω-cyanoguanyliminodithiocarbonate, was extremely soluble in organic solvents, with the exception of ligroin, in which it was insoluble.

EXAMPLE 2

*Dibutyl ω-cyanoguanyliminodithiocarbonate*

$$\begin{array}{c} C_4H_9-S \\ \phantom{C_4H_9-S}\diagdown \\ \phantom{C_4H_9-S\diagdown}C=N-\overset{NH}{\overset{\|}{C}}-\overset{H}{\overset{|}{N}}-CN \\ \phantom{C_4H_9-S}\diagup \\ C_4H_9-S \end{array}$$

To a solution of dipotassium ω-cyanoguanyliminodithiocarbonate, prepared by dissolving a mixture of 13.2 g. (0.20 mol) of 85% potassium hydroxide and 16.0 g. (0.10 mol) of 2-thio-4,6-diamino-1,3,5-thiadiazine in 250 cc. of water, was added 45.6 g. (0.20 mol) of butyl-p-toluenesulfonate and 100 cc. of Cellosolve. After being heated to 65° C. for 1¾ hours, the solution was concentrated under reduced pressure to a small volume and poured onto ice, which precipitated a pasty solid. The liquid was decanted, and the product washed with water and dried in an oven at 50° C. The pasty, yellow solid was dissolved in carbon tetrachloride, the solution decolorized with charcoal, filtered, and diluted with hexane until turbid. On standing, colorless plates of dibutyl ω-cyanoguanyliminodithiocarbonate, which melted at 78–80° C., separated.

EXAMPLE 3

*Di-p-chlorobenzyl ω-cyanoguanyliminodithiocarbonate*

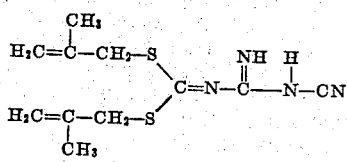

A solution of dipotassium ω-cyanoguanyliminodithiocarbonate was prepared by dissolving 12.4 g. (0.188 mol) of 85% potassium hydroxide in 250 cc. of water and adding 15.0 g. (0.094 mol) of 2-thio-4,6-diamino-1,3,5-thiadiazine. After addition of 20.5 g. (0.127 mol) of p-chlorobenzyl chloride, the mixture was stirred and heated to 60° C. Within 45 minutes colorless solid began to separate. Heating was continued 15 minutes longer, the mixture poured onto ice, and the solid filtered. Crystallization from a mixture of 60 parts methanol and 40 parts Cellosolve gave glittering plates of di-p-chlorobenzyl ω-cyanoguanyliminodithiocarbonate, which melted at 175–176° C.

EXAMPLE 4

*Di-α-Naphthylmethyl ω-cyanoguanyliminodithiocarbonate*

Into a 3-necked flask equipped with a condenser, stirrer, and thermometer was placed 17.65 g. (0.10 mol) of α-naphthylmethyl chloride, 10 cc. of Cellosolve, and a solution of dipotassium ω-cyanoguanyliminodithiocarbonate. The above solution was prepared by dissolving 6.6 g. (0.10 mol) of 85% potassium hydroxide in 100 cc. of water and adding 8.0 g. (0.05 mol) of 2-thio-4,6-diamino-1,3,5-thiadiazine. The mixture was vigorously stirred and heated to 60° C. Within 5 minutes a gummy solid separated, and after 15 more minutes the initial yellow color of the solution had disappeared along with all of the oily droplets of the alkylating agent, and the solid had become hard and granular. The mixture was cooled and the solid filtered, washed with water, and allowed to dry. The yield of tan solid, melting at 178–180° C. was 21.5 g. of 97.5% of the theoretical. Crystallization from butanol gave nearly colorless dense crystals of di-α-naphthylmethyl ω-cyanoguanyliminodithiocarbonate, which melted at 209–210° C.

EXAMPLE 5

*Reaction between 1,4-dichloropentene-2($H_3C$—$CHCl$—$CH$=$CH$—$CH_2Cl$) and dipotassium ω-cyanoguanyliminodithiocarbonate*

To a solution of dipotassium ω-cyanoguanyliminodithiocarbonate, prepared by adding 16.0 g. (0.10 mol) of 2-thio-4,6-diamino-1,3,5-thiadiazine to a solution of 13.2 g. (0.20 mol) of 85% potassium hydroxide in 150 cc. of water, was added 13.85 g. (0.10 mol) of 1,4-dichloropentene-2. The whole was stirred and maintained at a temperature of 60° C. for 30 minutes. During this time a tan gum separated. The liquid was decanted and the gum washed several times with water and allowed to stand. Solidification did not occur after five days, and apparently the product was polymeric in character.

EXAMPLE 6

*Dimethyl ω-cyanoguanyliminodithiocarbonate*

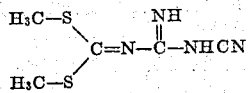

To a solution of 86 g. (2.10 mol) of 97% sodium hydroxide in 600 cc. of water was added 160 g. (1.0 mol) of 2-thio-4,6-diamino-1,3,5-thiadiazine. After filtration, the solution was stirred and heated to 50° C. Heating was discontinued, and freshly distilled dimethyl sulfate was slowly added. The mixture was cooled to keep the temperature below 70° C. After addition was complete, the mixture was cooled, and the tan, granular solid filtered, washed well with water and placed in a vacuum desiccator to dry and remove slight traces of mercaptan. The crude yield of product was 128 g. or 68% of theoretical. Purification, by dissolving the solid in isopropanol and precipitating with carbon tetrachloride, and crystallization from methanol gave colorless plates of dimethyl ω-cyanoguanyliminodithiocarbonate, which decomposed at 196–197° C. Analysis gave values in close agreement with the theoretical.

EXAMPLE 7

*Dibenzyl ω-cyanoguanyliminodithiocarbonate*

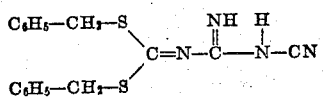

A mixture of 480 g. (3.0 mols) of 2-thio-4,6-diamino-1,3,5-thiadiazine, 400 g. (6.06 mols) of 85% potassium hydroxide, and 760 g. (6.0 mols) of benzyl chloride was heated to 60° C., after which the temperature increased spontaneously to 90° C. The mixture was then cooled and poured into ice water, whereupon the reaction product solidified. The crude dibenzyl ω-cyanoguanyliminodithiocarbonate was then dissolved in hot isopropanol, and the solution treated with activated charcoal and filtered. On standing, colorless crystals of dibenzyl ω-cyanoguanyliminodithiocarbonate separated from the solution. When recrystallized from methanol, with addition of carbon tetrachloride and naphtha, colorless needle-like crystals, having a melting point of 119–120° C., were obtained. Chemical analysis of the product indicated that it was practically pure dibenzyl ω-cyanoguanyliminothiocarbonate.

EXAMPLE 8

*Dibenzyl ω-cyanoguanyliminodithiocarbonate*

A mixture, consisting of 160 g. (1 mol) of 2-thio-4,6-diamino-1,3,5-thiadiazine, 350 g. (1.1 mols) of barium hydroxide octahydrate, and 253 g. (2.0 mols) of benzyl chloride, was heated to 35° C. and then cooled and allowed to react for several hours. During this time the reaction mixture was maintained at a temperature not in excess of 40° C. by cooling it occasionally. The oil-like material initially present solidified to a light yellow, granular solid. This product was dissolved in hot isopropanol, treated with activated charcoal, filtered, and cooled, whereupon crystals of dibenzyl ω-cyanoguanyliminodithiocarbonate separated from solution. The product was dissolved in methanol and re-crystallized as before. The final product was found to be dibenzyl ω-cyanoguanyliminodithiocarbonate of good purity.

EXAMPLE 9

*Dibenzyl ω-cyanoguanyliminodithiocarbonate*

A mixture of 160 g. (1 mol) of 2-thio-4,6-diamino-1,3,5-thiadiazine, 81.5 g. (1.1 mols) of calcium hydroxide, and 253 g. (2.0 mols) of benzyl chloride was stirred and heated at 35–37° C. for 6 hours. The pasty, tan-colored solid was filtered and dried in a vacuum desiccator. A portion of the product was then purified by recrystallization in the manner described in the previous examples. Dibenzyl ω-cyanoguanyliminodithiocarbonate of an excellent degree of purity was obtained with a final over-all yield of 33.5%.

EXAMPLE 10

*Dibenzyl ω-cyanoguanyliminodithiocarbonate*

A mixture of 160 g. (1.0 mol) of 2-thio-4,6-diamino-1,3,5-thiadiazine, 152 g. (1.1 mols) potassium carbonate, and 253 g. (2.0 mols) of benzyl chloride was heated at 50° C. for 2 hours, after which the temperature was raised to 65° C. for one-half hour. After being cooled, the mixture was poured into ice water, whereupon the oil-like reaction product solidified to a brown, slightly sticky solid, having a mercaptan odor. The product was re-crystallized several times from hot alcohol to obtain pure crystals of dibenzyl ω-cyanoguanyliminodithiocarbonate in an over-all yield of better than 50% of theoretical.

We claim:

1. Compounds having the general formula

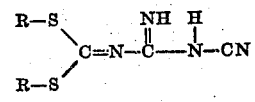

in which R is a member of the group consisting of alkyl and aralkyl radicals.

2. Compounds having the general formula

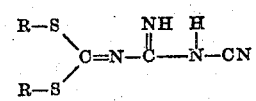

in which R is an alkyl radical.

3. Dimethyl ω-cyanoguanyliminodithiocarbonate.

4. Compounds having the general formula

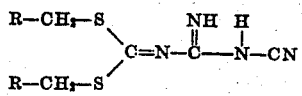

in which R is an aryl radical.

5. Dibenzyl ω-cyanoguanyliminodithiocarbonate.

6. A method of preparing dibenzyl ω-cyanoguanyliminocarbonate which comprises the step of mixing together a benzyl halide with a compound of the group consisting of alkali metal ω-cyanoguanyliminodithiocarbonates and alkaline earth metal ω-cyanoguanyliminodithiocarbonate and allowing the mixture to react at a temperature not in excess of about 75° C.

7. A method of preparing dibenzyl ω-cyanoguanyliminodithiocarbonate which comprises the step of mixing together an alkali metal ω-cyanoguanyliminodithiocarbonate with benzyl chloride and allowing the mixture to react at temperatures not in excess of about 75° C.

8. A method of preparing compounds of the group consisting of dialkyl and diaralkyl esters of ω-cyanoguanyliminodithiocarbonic acid which comprises the step of mixing together a member of the group consisting of alkyl halides, aralkyl halides, alkyl sulfates and aryl sulfonic alkyl esters with a compound of the group consisting of alkali metal and alkaline earth metal salts of ω-cyanoguanyliminodithiocarbonic acid.

9. A method of preparing compounds of the group consisting of dialkyl and diaralkyl esters of ω-cyanoguanyliminodithiocarbonic acid which comprises the step of mixing together a member of the group consisting of alkyl halides, aralkyl halides, alkyl sulfates and aryl sulfonic alkyl esters with dipotassium ω-cyanoguanyliminodithiocarbonate.

10. A method of preparing compounds of the group consisting of dialkyl and diaralkyl esters of ω-cyanoguanyliminodithiocarbonic acid which comprises the steps of mixing together a member of the group consisting of alkyl halides, aralkyl halides, alkyl sulfates and aryl sulfonic alkyl esters with disodium ω-cyanoguanyliminodithiocarbonate.

11. A method of preparing diaralkyl esters of ω-cyanoguanyliminodithiocarbonic acid which comprises the step of mixing together an aralkyl halide with an alkali metal ω-cyanoguanyliminodithiocarbonate and allowing the mixture to react at a temperature not in excess of about 75° C.

12. A method of preparing dialkyl esters of ω-cyanoguanyliminodithiocarbonic acid which comprises the step of mixing together an alkyl halide and an alkali metal ω-cyanoguanyliminodithiocarbonate and allowing the mixture to react at a temperature not in excess of about 75° C.

JACK T. THURSTON.
DONALD W. KAISER.

REFERENCES CITED

The following references are of record in the file of this patent:

UNITED STATES PATENTS

| Number | Name | Date |
| --- | --- | --- |
| 1,726,648 | Cadwell | Sept. 3, 1929 |
| 1,736,429 | Cadwell | Nov. 19, 1929 |

OTHER REFERENCES

"Organic Chem." Richter (Spielman), vol. 1, end Ed. p. 205.